US012554209B2

(12) United States Patent
Ishikawa et al.

(10) Patent No.: US 12,554,209 B2
(45) Date of Patent: Feb. 17, 2026

(54) TONER PARTICLE WITH AMORPHOUS POLYESTER RESIN

(71) Applicant: HEWLETT-PACKARD DEVELOPMENT COMPANY, L.P., Spring, TX (US)

(72) Inventors: Keiichi Ishikawa, Kanagawa (JP); Osamu Ieda, Kanagawa (JP); Takahiro Danno, Kanagawa (JP); Akinori Terada, Kanagawa (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 848 days.

(21) Appl. No.: 17/764,664

(22) PCT Filed: Oct. 13, 2020

(86) PCT No.: PCT/US2020/055366

§ 371 (c)(1),
(2) Date: Mar. 29, 2022

(87) PCT Pub. No.: WO2021/080817

PCT Pub. Date: Apr. 29, 2021

(65) Prior Publication Data

US 2022/0342331 A1 Oct. 27, 2022

(30) Foreign Application Priority Data

Oct. 25, 2019 (JP) ................................ 2019-194566

(51) Int. Cl.

| | |
|---|---|
| ***G03G 9/08*** | (2006.01) |
| ***G03G 9/087*** | (2006.01) |
| ***G03G 9/09*** | (2006.01) |
| ***G03G 9/093*** | (2006.01) |

(52) U.S. Cl.

CPC ....... *G03G 9/08755* (2013.01); *G03G 9/0806* (2013.01); *G03G 9/08782* (2013.01); *G03G 9/08795* (2013.01); *G03G 9/09* (2013.01); *G03G 9/09328* (2013.01); *G03G 9/09371* (2013.01)

(58) Field of Classification Search

None

See application file for complete search history.

(56) References Cited

U.S. PATENT DOCUMENTS

| | | | | |
|---|---|---|---|---|
| 4,049,447 | A * | 9/1977 | Azar .................. | G03G 9/08755 427/469 |
| 8,835,088 | B2 | 9/2014 | Sacripante et al. | |
| 8,916,322 | B2 | 12/2014 | Sacripante et al. | |
| 2005/0245694 | A1* | 11/2005 | Matsumura ............. | C08L 67/02 525/437 |
| 2006/0292476 | A1* | 12/2006 | Maehata .............. | G03G 9/0808 430/137.14 |
| 2008/0182188 | A1 | 7/2008 | Zhou et al. | |
| 2011/0300477 | A1 | 12/2011 | Yoshida et al. | |
| 2013/0236827 | A1 | 9/2013 | Yoshida et al. | |
| 2014/0134534 | A1* | 5/2014 | Sacripante ......... | G03G 9/09328 430/105 |
| 2016/0091811 | A1 | 3/2016 | Doi et al. | |

FOREIGN PATENT DOCUMENTS

| | | | | |
|---|---|---|---|---|
| JP | 2004286842 | A * | 10/2004 | ........... G03G 9/0804 |
| JP | 2005-300867 | A | 10/2005 | |
| KR | 10-0765744 | B1 | 10/2007 | |
| KR | 10-0846765 | B1 | 7/2008 | |
| WO | WO-2010/050023 | A1 | 5/2010 | |
| WO | WO-2017/012639 | A1 | 1/2017 | |
| WO | 2020/018177 | A1 | 1/2020 | |

OTHER PUBLICATIONS

JP-2004286842-A Translation (Year: 2025).*

* cited by examiner

*Primary Examiner* — Mark F. Huff
*Assistant Examiner* — Charles Collins Sullivan, IV
(74) *Attorney, Agent, or Firm* — Foley & Lardner LLP

(57) ABSTRACT

A toner particle includes a binder resin, a colorant, and a wax. The binder resin includes an amorphous polyester resin and a crystalline polyester resin. The amorphous polyester resin includes, as monomer units, a first monomer having a pendant group, terephthalic acid, and ethylene glycol.

15 Claims, No Drawings

TONER PARTICLE WITH AMORPHOUS POLYESTER RESIN

BACKGROUND

Imaging techniques based on electrostatically charged image, such as electrophotography, are used in a variety of fields for rendering image information visible. In electrophotography, the surface of a photoreceptor is uniformly charged, and then formed with an electrostatically charged image, which is an electrostatic latent image that is developed with a developer including toner particles, such that the electrostatic latent image is rendered visible as a toner image. The toner image is transferred and fixed onto the surface of a recording medium, so as to form an image (e.g, a printed image). The developer may be a two-component developer composed of toner particles and a carrier, and/or a one-component developer (or single-component developer) that uses either a magnetic toner exclusively or a non-magnetic toner exclusively.

DETAILED DESCRIPTION

Toner Particle

In the following description, examples of a toner particle will be described. According to examples, the toner particle may contain a binder resin, a colorant, and a wax.

Binder Resin

According to examples, the binder resin includes an amorphous polyester resin and a crystalline polyester resin. According to examples, the amorphous polyester resin may be a polyester resin which does not have a clear endothermic peak in differential scanning calorimetry (DSC). The amorphous polyester resin may be defined as, for example, a polyester resin showing a stepwise endothermic change when measurement is made by differential scanning calorimetry at a rate of temperature increase of 10° C./min, or a polyester resin having an endothermic peak with a half-value width of more than 15° C.

According to examples, an amorphous polyester resin may be a reaction product of polycondensation components including a polyhydric alcohol and a polycarboxylic acid. For example, the amorphous polyester resin may include a polyhydric alcohol and a polycarboxylic acid as monomer units. The example amorphous polyester resin includes an amorphous polyester resin having a pendant group (first amorphous polyester resin), and in some examples, the amorphous polyester resin includes an amorphous polyester resin having a pendant group (first amorphous polyester resin) and an amorphous polyester resin having no pendant group (second amorphous polyester resin).

The first amorphous polyester resin according to an example includes a first monomer having a pendant group, terephthalic acid, and ethylene glycol, as monomer units.

The first monomer includes, for example, a polycarboxylic acid having a branch chain having 3 or more carbon atoms. The branch chain in the polycarboxylic acid constitutes the pendant group in the first amorphous polyester resin (first monomer).

The branch chain in the polycarboxylic acid may refer to a chain that is branched out from this main chain when a chain having two carboxyl groups in a polycarboxylic acid is employed as the main chain. The branch chain may be a chain-like hydrocarbon group and may be, for example, an alkyl group or an alkenyl group. The number of carbon atoms of the branch chain may range from a minimum of 4, 6, 8, 10, 12, 14, 16 or 18, to a maximum of 32, 30, 28, 26, 24, 22, 20, 18, 16, 14 or 12.

The polycarboxylic acid may be, for example, a dicarboxylic acid having a branch chain having 3 or more carbon atoms, and is to include an anhydride of a dicarboxylic acid having a branch chain having 3 or more carbon atoms. Examples of the polycarboxylic acid include a succinic acid having an alkyl group having 3 or more carbon atoms, a succinic acid having an alkenyl group having 3 or more carbon atoms, an alkyl bis(succinic acid) having an alkyl group having 3 or more carbon atoms, an alkenyl bis (succinic acid) having an alkenyl group having 3 or more carbon atoms, and anhydrides thereof. Examples of the polycarboxylic acid include octyl succinic acid, decyl succinic acid, dodecyl succinic acid, tetradecyl succinic acid, hexadecyl succinic acid, octadecyl succinic acid, isooctadecyl succinic acid, hexenyl succinic acid, octenyl succinic acid, decenyl succinic acid, dodecenyl succinic acid, tetrapropenyl succinic acid, tetradecenyl succinic acid, hexadecenyl succinic acid, isooctadecenyl succinic acid, octadecenyl succinic acid, and nonenyl succinic acid. Such polycarboxylic acids are used singly or in a combination of two or more kinds thereof.

According to examples, in order to enhance or improve the dispersibility of the crystalline polyester resin in the first amorphous polyester resin, the content of the first monomer may range from a minimum of 1% by mole, 1.5% by mole or 2% by mole, to a maximum of 15% by mole, 12% by mole, 10% by mole, 9% by mole or 8% by mole, based on the total amount of the monomer units in the first amorphous polyester resin.

According to examples, the terephthalic acid and ethylene glycol may be respectively incorporated as terephthalic acid and ethylene glycol monomers in the reaction of polycondensation components, and may be products obtained as polyethylene terephthalate is incorporated and then is decomposed into terephthalic acid and ethylene glycol (e.g., products derived from polyethylene terephthalate). In examples where the terephthalic acid and ethylene glycol are components derived from polyethylene terephthalate, recycled polyethylene terephthalate can be used as this polyethylene terephthalate, to obtain a more environmentally friendly toner particle.

According to examples, the content of terephthalic acid may range from a minimum of 30% by mole, 32% by mole or 34% by mole, to a maximum of 70% by mole, 68% by mole or 66% by mole, based on the total amount of the monomer units in the first amorphous polyester resin.

According to examples, the content of ethylene glycol may range from a minimum of 30% by mole, 32% by mole or 34% by mole, to a maximum of 70% by mole, 68% by mole or 66% by mole, based on the total amount of the monomer units in the first amorphous polyester resin.

According to examples, the first amorphous polyester resin may additionally include, as a monomer unit, a monomer (second monomer) other than the first monomer, terephthalic acid, and ethylene glycol. Examples of the second monomer include a polyhydric alcohol other than ethylene glycol, and a polycarboxylic acid that does not have a branch chain having 3 or more carbon atoms, the polycarboxylic acid being a polycarboxylic acid other than terephthalic acid.

The polyhydric alcohol other than ethylene glycol may be, for example, a diol other than ethylene glycol. Examples of the diol other than ethylene glycol include: aliphatic diols such as ethylene glycol, diethylene glycol, triethylene glycol, propylene glycol, butanediol, hexanediol, neopentyl glycol, and glycerin; alicyclic diols such as cyclohexanediol, cyclohexanedimethanol, and hydrogenated bisphenol A; and aromatic diols such as an ethylene oxide adduct of bisphenol A and a propylene oxide adduct of bisphenol A. These polyhydric alcohols are used singly or in a combination of two or more kinds thereof. The diol may be an aromatic diol according to some examples, or an alicyclic diol according to other examples. According to examples, in order to form a crosslinked structure or a branched structure to secure satisfactory fixability, the polyhydric alcohol may further include, in addition to a diol, a polyhydric alcohol having a valency of 3 or higher (for example, glycerin, trimethylolpropane, or pentaerythritol).

According to examples, the content of the polyhydric alcohol other than ethylene glycol may range from a minimum of 1% by mole; 2% by mole or 4% by mole, to a maximum of 40% by mole, 30% by mole, or 20% by mole, based on the total amount of the monomer units in the first amorphous polyester resin.

According to examples, the polycarboxylic acid that does not have a branch chain having 3 or more carbon atoms (except for terephthalic acid) may be, for example, a dicarboxylic acid that does not have a branch chain having 3 or more carbon atoms (except for terephthalic acid), and an anhydride of a dicarboxylic acid that does not have a branch chain having 3 or more carbon atoms (except for terephthalic acid) is also to be included. Examples of the polycarboxylic acid include adipic acid, phthalic acid, isophthalic acid, tetrachlorophthalic acid, chlorophthalic acid, nitrophthalic acid, p-carboxyphenylacetic acid, p-phenylene-2-acetic acid, m-phenylene diglycolic acid, p-phenylene diglycolic acid, o-phenylene diglycolic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracene dicarboxylic acid, cyclohexane dicarboxylic acid, and anhydrides thereof, Such polycarboxylic acids may be used singly or in a combination of two or more kinds thereof.

The polycarboxylic acid that does not have a branch chain having 3 or more carbon atoms (except for terephthalic acid) may also be a polycarboxylic acid having a valency of 3 or higher, which does not have a branch chain having 3 or more carbon atoms. Examples of this polycarboxylic acid include trimellitic acid, pyromellitic acid, naphthalene tricarboxylic acid, naphthalene tetracarboxylic acid, pyrene tricarboxylic acid, pyrene tetracarboxylic acid, and acid anhydrides, acid chlorides, or esters of such carboxylic acids.

The content of the polycarboxylic acid that does not have a branch chain having 3 or more carbon atoms (except for terephthalic acid) may range from a minimum of 1% by mole, 2% by mole or 4% by mole, to a maximum of 52% by mole, 50% by mole or 48% by mole, based on the total amount of the monomer units in the first amorphous polyester resin.

According to examples, in order to enhance or improve the dispersibility of the crystalline polyester resin in the first amorphous polyester resin, the weight average molecular weight of the first amorphous polyester resin may range from a minimum of 5,000, 6,000 or 8,000, to a maximum of 40,000, 30,000, 25,000, 18,000 or 16,000.

The weight average molecular weight of the first amorphous polyester resin according to examples, is measured according to gel permeation chromatography (GPC) of a tetrahydrofuran (THF)-soluble fraction. The weight average molecular weight may be determined by the following example method. Waters e2695 (manufactured by Nihon Waters K.K.) is used as a measuring apparatus, and two sets of Inertsil CN-3 25 cm (manufactured by GL Sciences, Inc.) are used as columns. A filtrate obtained by introducing 10 mg of a first amorphous polyester resin into 10 mL of tetrahydrofuran (THF) (containing a stabilizer, manufactured by Wako Pure Chemical Industries, Ltd.), stirring the mixture for one hour, and then filtering the mixture through a 0.2 μm filter, is used as a sample. A sample solution in tetrahydrofuran (THF) is injected into the measuring apparatus in an amount of 20 μL, and measurement is made under the conditions of 40° C. and a flow rate of 1.0 mL/min.

The glass transition temperature (Tg) of the first amorphous polyester resin may range from a minimum of 50° C. to a maximum of 80° C. or 70° C.

The melt viscosity at 120° C. of the first amorphous polyester resin may range from a minimum of 200 Pa·s, 250 Pa·s or 300 Pa·s, to a maximum of 20,000 Pa·s, 19,500 Pa·s, or 19,000 Pa·s, in order to improve low-temperature fixability. The melt viscosity according to the present example is measured by the following method. According to the measuring method, using a flow tester (for example, SHIMADZU CORPORATION "CFT-500D"), 1 g of the first amorphous polyester resin is shaped into a pellet form at 20 MPa, a load of 10 kg is applied by a plunger at a constant temperature of 120° C., and the first amorphous polyester resin is extruded through a nozzle having a diameter of 1 mm and a length of 1 mm. Viscosity is calculated based on the amount of deposition with respect to the time of the plunger of the flow tester.

According to examples, the content of the first amorphous polyester resin may range from a minimum of 55% by mass, 70% by mass or 80% by mass, to a maximum of 92% by mass, 90% by mass, 85% by mass or 80% by mass, based on the total amount of the binder resin. The content of the first amorphous polyester resin may range from a minimum of 48% by mass or 56% by mass, to a maximum of 72% by mass or 64% by mass, based on the total amount of the toner particle.

According to examples, the mass ratio of the content of the first amorphous polyester resin with respect to the content of the crystalline polyester resin (content of first amorphous polyester resin/content of crystalline polyester resin) may range from a minimum of 85/15 or 90/10, to a maximum of 95/5 or of 93/7.

The second amorphous polyester resin includes, as monomer units, a polyhydric alcohol and a polycarboxylic acid that does not have a branch chain having 3 or more carbon atoms. Examples of the polyhydric alcohol are similar to the polyhydric alcohols described for the first amorphous polyester resin. The polyhydric alcohols may be used singly or in a combination of two or more kinds thereof.

The polycarboxylic acid that does not have a branch chain having 3 or more carbon atoms may be, for example, a dicarboxylic acid that does not have a branch chain having 3 or more carbon atoms, and an anhydride of a dicarboxylic acid that does not have a branch chain having 3 or more carbon atoms may also be included, Examples of the polycarboxylic acid include adipic acid, phthalic acid, terephthalic acid, isophthalic acid, tetrachlorophthalic acid, chlorophthalic acid, nitrophthalic acid, p-carboxyphenylacetic acid, p-phenylene-2-acetic acid, m-phenylene diglycolic acid, p-phenylene diglycolic acid, o-phenylene diglycolic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracene dicarboxylic acid, cyclohexane dicarboxylic acid, and anhydrides thereof.

The polycarboxylic acid that does not have a branch chain having 3 or more carbon atoms may also be a trivalent or higher-valent polycarboxylic acid that does not have a branch chain having 3 or more carbon atoms. Examples of the polycarboxylic acid include trimellitic acid, pyromellitic acid, naphthalene tricarboxylic acid, naphthalene tetracarboxylic acid, pyrene tricarboxylic acid, pyrene tetracarboxylic acid, and acid anhydrides, acid chlorides, or esters of these carboxylic acids.

According to examples, the content of the polyhydric alcohol may range from a minimum of 45% by mole, 47% by mole or 49% by mole, to a maximum of 55% by mole, 53% by mole or 51% by mole, based on the total amount of the monomer units in the second amorphous polyester resin.

According to examples, the content of the polycarboxylic acid that does not have a branch chain having 3 or more carbon atoms may range from a minimum of 45% by mole, 47% by mole or 49% by mole, to a maximum of 55% by mole, 53% by mole or 51% by mole, based on the total amount of the monomer units in the second amorphous polyester resin.

In order to suppress or inhibit a decrease in the strength of the binder resin and a decrease in the glass transition temperature of the toner particle, and to enhance or improve low-temperature fixability, the intensity of images fixed on paper, and the preservability of the toner particle, the weight average molecular weight of the second amorphous polyester resin may range from a minimum of 30,000, 40,000 or 50,000, to a maximum of 80,000, 70,000, or 60,000. The weight average molecular weight of the second amorphous polyester resin may be measured by a similar method as that for the weight average molecular weight of the first amorphous polyester resin.

According to examples, the content of the second amorphous polyester resin may range from a minimum of 15% by mass, 20% by mass or 25% by mass, to a maximum of 40% by mass, 35% by mass or 30% by mass, based on the total amount of the binder resin. According to examples, the content of the second amorphous polyester resin may range from a minimum of 15% by mass or 20% by mass, to a maximum of 30% by mass or 25% by mass, based on the total amount of the toner particle.

The crystalline polyester resin may be a polyester resin having a clear endothermic peak in modified differential scanning calorimetry (MSC). The binder resin may include a crystalline polyester resin, in order to enhance or improve the image glossiness of the toner and the low-temperature fixability.

A crystalline polyester resin is, for example, a reaction product between a polyhydric alcohol and a polycarboxylic acid. Accordingly, the crystalline polyester resin may include a polyhydric alcohol and a polycarboxylic acid as monomer units.

According to examples, the polyhydric alcohol may be a did. In order to more easily form a crystalline polyester having a suitable or targeted melting point for the toner particle, according to examples, the number of carbon atoms of the polyhydric alcohol may range from a minimum of 8 or 9, to a maximum of 12 or 10. In some examples, the number of carbon atoms of the polyhydric alcohol may be of 9 or 10. Examples of the polyhydric alcohol include 1,9-nonanediol.

The polycarboxylic acid may be, for example, an aliphatic polycarboxylic acid, and may be a dicarboxylic acid. In order to increase a linearity of the structure of the crystalline polyester resin, and to enhance or improve the affinity with the first amorphous polyester resin, the polycarboxylic acid may be an aliphatic dicarboxylic acid. In order to more easily form a crystalline polyester having a suitable or targeted melting point for the toner particle, the number of carbon atoms of the polycarboxylic acid (excluding for the carbons constituting a carboxyl group) may range from a minimum of 8 or 9, to a maximum of 12 or 10. According to examples, number of carbon atoms of the polycarboxylic acid may be of 9 or 10. Examples of the polycarboxylic acid include 1,10-decane dicarboxylic acid and 1,12-dodecane dicarboxylic acid.

In order to suppress or inhibit a decrease in the strength of the binder resin and a decrease in the glass transition temperature of the toner particle, and to enhance or improve a low-temperature fixability, the intensity of images fixed on paper, and the preservability of the toner particle, the weight average molecular weight of the crystalline polyester resin may range from a minimum of 5,000, 5,100 or 5,400, to a maximum of 15,000, 10,000, 8,000, 5,900 or 5,700. The weight average molecular weight of the crystalline polyester resin may be measured by a similar method as that for the weight average molecular weight of the first amorphous polyester resin.

In order to suppress or inhibit aggregation of the toner particles, and to enhance or improve the preservability of fixed images and the low-temperature fixability, the melting temperature (Tm) of the crystalline polyester may range from a minimum of 60° C. to a maximum of 100° C. or of 75° C.

According to examples, the content of the crystalline polyester resin may range from a minimum of 8% by mass or 10% by mass, to a maximum of 30% by mass or 20% by mass, based on the total amount of the binder resin. The content of the crystalline polyester resin may range from a minimum of 10% by mass or 15% by mass, to a maximum of 30% by mass or 20% by mass, based on the total amount of the toner particle.

The binder resin may further include other resins in addition to the amorphous polyester resin and crystalline polyester resin. Examples of the other resins include a styrene-(meth)acrylic copolymer, an epoxy resin, and a styrene-butadiene copolymer. The styrene-(meth)acrylic copolymer may be a copolymer of a styrene-based monomer and a (meth)acrylic acid ester-based monomer. Examples of the styrene-based monomer include styrene, o- (m-, p-) methylstyrene and m- (p-) ethylstyrene. Examples of the (meth)acrylic acid ester-based monomer include methyl (meth)acrylate, ethyl (meth)acrylate, propyl (meth)acrylate, butyl (meth)acrylate, octyl (meth)acrylate, dodecyl (meth) acrylate, stearyl (meth)acrylate, behenyl (meth)acrylate, 2-ethylhexyl (meth)acrylate, dimethylaminoethyl (meth) acrylate, and diethylaminoethyl (meth)acrylate.

According to examples, the total content of the amorphous polyester resin and the crystalline polyester resin in the binder resin may range from a minimum of 80% by mass, 85% by mass or 90% by mass to a maximum of 98% by mass or 95% by mass, based on the total amount of the binder resin.

The binder resin may have calorific value Tg2nd+dH in a differential scanning calorimetric curve measured using a modified differential scanning calorimeter (MDSC). The Tg2nd+dH of the binder resin may be within a range that has a minimum of 5 J/g, 10 J/g or 15 J/g, in order to suppress or inhibit a decrease in the strength of the binder resin and a decrease in the glass transition temperature of the toner particle, and in order to enhance or improve the low-temperature fixability, the intensity of images fixed on paper, and the preservability of the toner particle.

The Tg2nd+dH of the binder resin refers to the calorific value of the binder resin measured on the second time using a modified differential scanning calorimeter (MDSC). The Tg2nd+dH can be determined by the following example method. For the binder resin, a temperature increase is carried out as a first temperature increase process, using a modified differential scanning calorimeter Q2000 (manufactured by TA Instruments, Inc.), from room temperature to 140° C. at a modulation amplitude of 0.1° C., a modulation cycle of 10 seconds, and a rate of 3° C. per minute, and after completion, the temperature is decreased to 0° C. at a rate of 20° C. per minute. The temperature is held at 0° C. for 5 minutes, and then temperature increase is carried out again as a second temperature increase process, from 0° C. to 140° C. at a modulation amplitude of 0.1° C., a modulation cycle of 10 seconds, and a rate of 3° C. per minute. As a result, the +dH may be determined from a differential scanning calorimetric curve thus obtained.

According to examples, the content of the binder resin in the toner particle may range from a minimum of 40% by mass, 45% by mass or 50% by mass, to a maximum of 90% by mass, 85% by mass or 80% by mass, based on the total amount of the toner particle.

Examples of the binder resin described above, the binder resin may have improved dispersibility of the crystalline polyester resin in the first amorphous polyester resin. Furthermore, regarding this binder resin, molecular weight reduction can be achieved even in the case of having the same Tg. According, toner particles containing this binder resin may have improved low-temperature fixability.

Colorant

The colorant can include at least one colorant selected from, for example, a black colorant, a cyan colorant, a magenta colorant, and a yellow colorant. Regarding the colorant, one kind is used alone, or two or more kinds are used as a mixture, in consideration of hue, chroma, brightness, weather-resistance, dispersibility in toner, and/or the like.

The black colorant may be carbon black or aniline black. The yellow colorant may be a condensed nitrogen compound, an isoindolinone compound, an anthraquine compound, an azo metal complex, or an allylimide compound. Specific examples of the yellow colorant include C.I. Pigment Yellow 12, 13, 14, 17, 62, 74, 83, 93, 94, 95, 109, 110, 111, 128, 129, 147, 168, and 180.

The magenta colorant may be a condensed nitrogen compound, anthraquine, a quinacridone compound, a basic dye lake compound, a naphthol compound, a benzimidazole compound, a thioindigo compound, or a perylene compound. Specific examples of the magenta colorant include C.I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254.

The cyan colorant may be a copper phthalocyanine compound or a derivative thereof, an anthraquine compound, or the like. Specific examples of the cyan colorant include C.I. Pigment Blue 1, 7, 15, 15:1, 15:2, 15:3, 15:4, 60, 62, and 66.

According to examples, the content of the colorant may be within a range having a minimum of 0.5% by mass, 1% by mass or 2% by mass, based on the total amount of the toner particle, in order to exhibit a sufficient or improved coloration effect. In order to achieve a sufficient amount of frictional electrification without having significant influence on the increase in the production cost of the toner particle, the range of the content of the colorant may have a maximum of 15% by mass, 12% by mass or 10% by mass, based on the total amount of the toner particle.

Wax

A wax can function as, for example, a mold release agent. A mold release agent may enhance low-temperature fixability, final image durability, and abrasion resistance characteristics of the toner particle. Accordingly, the type and content of the wax that serves as a mold release agent can be determined by taking into consideration the characteristics of the toner.

The wax may be a natural wax or a synthetic wax. According to some examples, the type of the wax can be selected from the group consisting of, for example, a polyethylene-based wax, a polypropylene-based wax, a silicon wax, a paraffin-based wax, an ester-based wax, a carnauba wax, beeswax, and a metallocene wax, or the like. Some examples of wax include solid paraffin wax, microwax, rice wax, a fatty acid amide-based wax, a fatty acid-based wax, an aliphatic monoketone, a fatty acid metal salt-based wax, a fatty acid ester-based wax, a partially saponified fatty acid ester-based wax, a silicone varnish, a higher alcohol, and carnauba wax. Furthermore, a polyolefin such as a low-molecular weight polyethylene or polypropylene, or the like can also be used.

The wax may be an ester-based wax containing an ester group. Examples thereof include a mixture of an ester-based wax and a non-ester-based wax, and an ester group-containing wax obtained by incorporating an ester group into a non-ester-based wax.

With regard to an ester-based wax component, an ester group has a relatively high affinity with a latex component of toner particle, and accordingly wax can be made to be uniform within the toner particle, in order to improve the effect of the action of the wax. A non-ester-based wax component tends to suppress the excessive plasticizing action when the wax is composed of ester-based waxes exclusively, as a result of mold release action with latex. Accordingly, a mixture of an ester-based wax and a non-ester-based wax may be used to maintain sufficient or suitable developability of toner for a substantially long period of time.

The ester-based wax may be an ester of a fatty acid having 15 to 30 carbon atoms and a monohydric alcohol to a pentahydric alcohol, such as behenyl behenate, stearyl stearate, stearic acid ester of pentaerythritol, and montanic acid glyceride. The alcohol component constituting the ester may be a monohydric alcohol having 10 to 30 carbon atoms or a polyhydric alcohol having 3 to 30 carbon atoms, Examples of the non-ester-based wax include a polyethylene-based wax, a polypropylene-based wax, a silicon wax, and a paraffin-based wax.

Examples of the ester-based wax containing an ester group include a mixture of a paraffin-based wax and an ester-based wax, and an ester group-containing paraffin-based wax, and specific examples thereof include, for example, product names P-212, P-280, P-318, P-319, and P-419 of CHUKYO YUSHI CO., LTD.

In examples where the wax is a mixture of a paraffin-based wax and an ester-based wax, the content of the ester-based wax may be within a range that has a minimum of 1% by mass, 5% by mass, 10% by mass or 15% by mass, based on the total amount of the mixture of a paraffin-based wax and an ester-based wax, in order to sufficiently or suitably maintain the compatibility with a latex that is used at the time of production of toner particles. In addition, in order to achieve a suitable or improved plasticity of the toner particle and to achieve long-term maintenance of developability, the range of the content of the ester-based wax may have a maximum of 50% by mass based on the total amount of the toner particle.

The melting temperature of the wax may range from a minimum of 60° C. or 70° C., to a maximum of 100° C. or 90° C. The wax component may be a component that physically adheres tightly to toner particle but does not form covalent bonding with the toner particle.

In order to suppress or inhibit a plasticization phenomenon between the binder resin and the wax, the wax may have a solubility parameter (SP) value, such that a difference between the SP value of the wax and the solubility parameter (SP) value of the binder resin is 2 or more.

According to examples, the content of the wax may be within a range that has a minimum of 1% by mass, 2% by mass or 3% by mass, based on the total amount of the toner particle, in order to achieve a suitable or improved low-temperature fixability and a sufficient or improved fixing temperature range. In addition, in order to improve preservability and economic efficiency, the range of the content of the wax may have a maximum of 20% by mass, 16% by mass or 12% by mass, based on the total amount of the toner particle.

Other Components

According to examples, the toner particle may further include a charge control agent. The charge control agent may be internally added or externally added to the toner particle. The charge control agent may be a negative charge control agent or a positive charge control agent.

Examples of the negative charge control agent include a salicylic acid metal compound, a naphthoic acid metal compound, a dicarboxylic acid metal compound, a polymer type compound having sulfonic acid or carboxylic acid in a side chain, a polymer type compound having a sulfonic acid salt or a sulfonic acid esterification product in a side chain, a polymer type compound having a carboxylic acid salt or a carboxylic acid esterification product in a side chain, a boron compound, a urea compound, a silicon compound, and a calixarene.

Examples of the positive charge control agent include a quaternary amount salt, a polymer type compound having a quaternary ammonium salt in a side chain, a guanidine compound, and an imidazole compound.

The toner particle may further include inorganic microparticles as necessary. The inorganic microparticles may be internally added or externally added to the toner particles. Examples of the inorganic microparticles include silica microparticles, titanium oxide microparticles, and aluminum oxide microparticles. These inorganic microparticles may be, for example, hydrophobized with a hydrophobizing agent such as a silane compound, a silicone oil, or a mixture thereof.

According to examples, the specific surface area of the inorganic microparticles may range from a minimum of 10 $m^2/g$ or 50 $m^2/g$, to a maximum of 400 $m^2/g$ or 50 $m^2/g$. The content of the inorganic microparticles may range from a minimum of 0.1% by mass to a maximum of 10% by mass, based on the total amount of the toner particle.

The toner particle may contain iron element, silicon element, and sulfur element, and in addition to these elements, fluorine element may also be further incorporated in some examples. According to examples, the iron element and silicon element may be components that originate from an aggregating agent and/or the like. Sulfur element may be a component originating from a production catalyst for a self-adhesive resin, an aggregating agent, and/or the like. Fluorine element may be a component originating from a production catalyst for a self-adhesive resin and/or the like.

In order to improve the toner particle so as to be more suitable for use in developing an electrostatically charged image, the content of iron element may range from a minimum of $1.0\times10^3$ ppm, to a maximum of $1.0\times10^4$ ppm or of $5.0\times10^3$ ppm. In order to further improve the toner particle to be more suitable for use in developing an electrostatically charged image, the content of silicon element may range from a minimum of $1.0\times10^3$ ppm or $1.5\times10^3$ ppm, to a maximum of $5.0\times10^3$ ppm or $4.0\times10^3$ ppm. The contents of iron element and silicon element can be controlled by regulating the type, amount, and/or the like of the aggregating agent to be used.

In order to improve the toner particle to be more suitable for use in developing an electrostatically charged image, the content of sulfur element may range from a minimum of 500 ppm or 1,000 ppm to a maximum of 3,000 ppm. The content of sulfur element can be controlled by regulating the types, amounts, and/or the like of the catalyst and aggregating agent to be used.

In order to improve the toner particle so as to be more suitable for use in developing an electrostatically charged image, the content of fluorine atom may range from a minimum of $1.0\times10^3$ ppm or $5.0\times10^3$ ppm, to a maximum of $1.0\times10^4$ ppm or $8.0\times10^3$ ppm. The content of fluorine atom can be controlled by regulating the type and amount of the catalyst to be used.

The contents of the various elements in the toner particle can be measured by, for example, fluorescent X-ray analysis. For example, an X-ray analyzer EDX-720 (manufactured by SHIMADZU CORPORATION) may be used as a measuring apparatus, and measurement can be performed under the conditions of an X-ray tube voltage of 50 kV and an amount of sample molding of 30.0 g. The contents of various elements can be determined by utilizing the intensity (cps/μA) from the quantification results derived by fluorescent X-ray analysis.

According to examples, the average particle size of the toner particles may range, for example, from a minimum of 3 μm or 5 μm, to a maximum of 7 μm or 6 μm. The average particle size of the toner particles is a volume average particle size that may be determined by the following example method. The volume average particle size of the toner particles is measured by a pore electrical resistance method. According to the method, a Coulter counter (manufactured by Beckman Coulter, Inc.) is used as a measuring apparatus, ISOTON II (manufactured by Beckman Coulter, Inc.) is used as an electrolytic solution, an aperture tube having an aperture diameter of 100 μm is used, and measurement is performed under the conditions of a number of particles measured of 30,000. Based on a particle size distribution of the particles thus measured, the volumes occupied by the particles included in divided particle size ranges are cumulated from the smaller diameter side, and the cumulative 50% particle size is designated as the volume average particle size Dv50.

According to examples, the toner particle may have a core-shell structure. A toner particle may include a core containing the above-mentioned binder resin (the above-mentioned amorphous polyester resin (first amorphous polyester resin) and the above-mentioned crystalline polyester resin), the above-mentioned colorant, and the above-mentioned wax, and may further include a shell containing the above-mentioned amorphous polyester resin (first amorphous polyester resin).

According to examples, the proportion of the core in the toner particle may range from a minimum of 50% by mass, 55% by mass or 60% by mass, to a maximum of 85% by mass, 80% by mass or 75% by mass, based on the total amount of the toner particle. The proportion of the shell in the toner particle may range from a minimum of 10% by mass, 15% by mass or 20% by mass, to a maximum of 40% by mass, 35% by mass or 30% by mass, based on the total amount of the toner particle.

According to examples, the toner particle can be used as a one-component developer (single-component developer). In order to further enhance dot reproducibility and to supply stable images over a long period of time, the toner particle can be mixed with a magnetic carrier and used as a two-component developer (dual-component developer).

Examples of the magnetic carrier include: iron oxide; metal particle such as iron, lithium, calcium, magnesium, nickel, copper, zinc, cobalt, manganese, chrome, and rare earth elements; particle of alloys thereof, particle of oxides thereof; magnetic bodies such as ferrites; and a magnetic body-dispersed resin carrier (also referred to as resin carrier) containing a magnetic body and a binder resin that maintains the magnetic body in a dispersed state.

Examples where the toner particles are mixed with a magnetic carrier and are used as a two-component developer, the content of the toner particle may range from a minimum of 2% by mass or 4% by mass, to a maximum of 15% by mass or 13% by mass, based on the total amount of the two-component developer.

The toner particle may be accommodated in, for example, a toner cartridge. For example, the toner particle may be accommodated within a container in a toner cartridge. In other examples, a toner cartridge including a container that accommodates the toner particle described above.

Method for Producing Toner Particle

An example method for producing the example toner particle described above will be described. An example method for producing toner particle includes a process of reacting polycondensation components including a first monomer having a pendant group and polyethylene terephthalate and thereby obtaining a amorphous polyester resin (first amorphous polyester resin) (also referred to as process A), and a process of obtaining toner particle from raw materials including the amorphous polyester resin (first amorphous polyester resin), a crystalline polyester resin, a colorant, and a wax (also referred to as process B).

Process A

In process A, polycondensation components, an esterification catalyst, and/or the like are introduced together into a reaction vessel, and a first amorphous polyester resin is obtained by an esterification reaction. The polycondensation components may further include, in addition to the first monomer and the polyethylene terephthalate, a polyhydric alcohol other than ethylene glycol, and a polycarboxylic acid that does not have a branch chain having 3 or more carbon atoms.

The first monomer has been described above. The feed amount of the first monomer may be within a range having a minimum of 1% by mole, 1.5% by mole, or 2% by mole, to a maximum of 15% by mole, 12% by mole, 10% by mole, 9% by mole or 8% by mole, based on the total amount of the polycondensation components.

Since polyethylene terephthalate is first decomposed into terephthalic acid and ethylene glycol in an esterification reaction, the physical properties (for example, weight average molecular weight or the like) of the polyethylene terephthalate to be used as a polycondensation component are not particularly limited. The polyethylene terephthalate may be a recycled polyethylene terephthalate, to provide a more environmentally friendly toner particle.

According to examples, the feed amount of polyethylene terephthalate may range from a minimum of 30% by mole, 32% by mole or 34% by mole, to a maximum of 70% by mole, 68% by mole or 66% by mole, based on the total amount of the polycondensation components. The feed amount of polyethylene terephthalate may be a value obtained by calculating the molecular weight of a structure corresponding to one constituent unit of polyethylene terephthalate (unit composed of one molecule of ethylene glycol and one molecule of terephthalic acid being esterified) ($=192=62+166-(18\times2)$), relative to the molar mass of polyethylene terephthalate. That is, the feed amount of polyethylene terephthalate is a relative value calculated by assuming that the amount of substance of polyethylene terephthalate is 192 g/mol.

The polyhydric alcohol other than ethylene glycol has been described above. The feed amount of the polyhydric alcohol other than ethylene glycol may range from a minimum of 1% by mole, 2% by mole or 4% by mole, to a maximum of 40% by mole, 30% by mole or 20% by mole, based on the total amount of the polycondensation components.

The polycarboxylic acid that does not have a branch chain having 3 or more carbon atoms may be, for example, a dicarboxylic acid that does not have a branch chain having 3 or more carbon atoms, and an anhydride of a dicarboxylic acid that does not have a branch chain having 3 or more carbon atoms is also to be included. Examples of this polycarboxylic acid include adipic acid, phthalic acid, terephthalic acid, isophthalic acid, tetrachlorophthalic acid, chlorophthalic acid, nitrophthalic acid, p-carboxyphenylacetic acid, p-phenylene-2-acetic acid, m-phenylene diglycolic acid, p-phenylene diglycolic acid, o-phenylene diglycolic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracene dicarboxylic acid, cyclohexane dicarboxylic acid, and anhydrides thereof. These polycarboxylic acids are used singly or in a combination of two or more kinds thereof.

The polycarboxylic acid that does not have a branch chain having 3 or more carbon atoms may be a polycarboxylic acid having a valency of 3 or higher, which does not have a branch chain having 3 or more carbon atoms. Examples of this polycarboxylic acid include trimellitic acid, pyromellitic acid, naphthalene tricarboxylic acid, naphthalene tetracarboxylic acid, pyrene tricarboxylic acid, pyrene tetracarboxylic acid, and acid anhydrides, acid chlorides, or esters of these carboxylic acids.

The content of the polycarboxylic acid that does not have a branch chain having 3 or more carbon atoms may range from a minimum of 1% by mole, 2% by mole or 4% by mole, to a maximum of 52% by mole, 50% by mole or 48% by mole, based on the total amount of the polycondensation components.

Examples of the esterification catalyst include antimony-based, tin-based, titanium-based, and aluminum-based catalysts. The esterification catalyst may also be, for example, an organic metal such as dibutyltin, dilaurate, or dibutyltin oxide, or may be a metal alkoxide such as tetrabutyl titanate or the like. The feed amount of the esterification catalyst may range, for example, from a minimum of 0.05 part by mass or 0.2 part by mass, to a maximum of 1 part by mass or 0.7 part by mass, with respect to 100 parts by mass of the total amount of the polycondensation components.

Process B

In process B, a dispersion liquid (latex) of the first amorphous polyester resin obtained in process A (dispersion liquid (latex) of the first amorphous polyester resin) and a crystalline polyester resin, and in some examples, a dispersion liquid (latex) of a second amorphous polyester resin are mixed in, for example, an aqueous system. Subsequently, a colorant dispersion liquid and a wax dispersion liquid are mixed, and an aggregating agent is added thereto to obtain a mixture. The mixture is stirred in a homogenizer or the like, and the temperature is increased to obtain an aggregated particle containing a binder resin including a first amorphous polyester resin and a crystalline polyester resin, a colorant, and a wax, so as to form cores of the toner particles.

Subsequently, a latex of the first amorphous polyester resin is further mixed, and a shell composed of the first amorphous polyester resin is formed on the surface of the aggregated particle, to obtain coated aggregated particles. The coated aggregated particles are heated, which causes the particles inside the coated aggregated particles to melt and coalesce, so as to obtain toner particles. According to this example method, toner particle having the above-described core-shell structure are obtained.

EXAMPLES

Examples of the toner particle will be described hereinafter, although the toner particle is not limited to such examples.

Preparation of First Amorphous Polyester Resins 1 to 4

Polyhydric alcohols, polycarboxylic acids, polyethylene terephthalate, and esterification catalysts in the feed amounts shown in Table 1 were introduced into a 1-liter four-necked flask equipped with a nitrogen inlet tube, a dewatering tube, a stirrer, and a thermocouple, and the components were caused to react at 245° C. in a nitrogen atmosphere. The resulting first amorphous polyester resins 1 to 4 have the physical properties indicated in Table 1. The feed amount of polyethylene terephthalate represents a relative value calculated by assuming that the amount of substance of polyethylene terephthalate is 192 g/mol.

TABLE 1

| | | | First amorphous polyester resin | | | |
|---|---|---|---|---|---|---|
| | | | 1 | 2 | 3 | 4 |
| Feed amount (% by mole) | Polyhydric alcohol | Propylene oxide adduct of bisphenol A (average number of added moles 2) | 10 | 10 | 10 | 13 |
| | Poly-carboxylic acid | Terephthalic acid | 47 | 22 | — | 15 |
| | | Isophthalic acid | — | — | 47 | — |
| | | Dimer acid | 2 | 2 | 2 | 2 |
| | Polyethylene terephthalate | | 41 | 66 | 41 | 70 |
| Monomer having pendant group (branch chain) | | Content (% by mole) | 2 | 2 | 2 | 2 |
| | | Number of carbon atoms of pendant group (branch chain) | 16 to 24 | 16 to 24 | 16 to 24 | 16 to 24 |
| Weight average molecular weight | | | 9122 | 8752 | 8056 | 9076 |
| Melt viscosity at 120° C. (Pa · s) | | | 848 | 763 | 413 | 882 |

300 g of a first amorphous polyester resin, 250 g of methyl ethyl ketone, and 50 g of isopropyl alcohol were introduced into a 3-liter double-jacketed reactor. The interior of the reaction vessel was stirred using a semi-moon type impeller in an environment having a temperature of approximately 30° C., to dissolve the resin so as to obtain a resin solution. The resin solution was stirred, 20 g of a 5% aqueous solution of ammonia was slowly added into the reaction vessel, and subsequently 1,200 g of water was added at a rate of 20 g/min to produce an emulsion. Subsequently, a mixed solvent of methyl ethyl ketone and isopropyl alcohol was removed from the emulsion by a reduced pressure distillation method until the concentration of the first amorphous polyester resin as a solid component became 20% by mass. As a result, a latex of each of the first amorphous polyester resins 1 to 4 was obtained.

Preparation of Comparative Amorphous Polyester Resin 5

Comparative amorphous polyester resin 5 was synthesized in a similar manner as in the case of the amorphous polyester resins 1 to 4, with the exception that 51% by mole of a propylene oxide adduct of bisphenol A (average number of added moles 2) and 49% by mole of terephthalic acid as polycondensation components were used, to obtain a latex of the comparative amorphous polyester resin 5. The weight average molecular weight of this comparative amorphous polyester resin 5 was 10,685, and the melt viscosity at 120° C. was 6,214 Pa·s.

Preparation of Second Amorphous Polyester Resin

A second amorphous polyester resin was synthesized in a similar manner as in the case of the first amorphous polyester resins 1 to 4, with the exception that 36% by mole of a propylene oxide adduct of bisphenol A (average number of added moles 2), 14% by mole of an ethylene oxide adduct of bisphenol A (average number of added moles 2), 47% by mole of terephthalic acid, and 3% by mole of trimellitic anhydride were used as the polycondensation components, to obtain a latex of the second amorphous polyester resin. The weight average molecular weight of this second amorphous polyester resin was 56,473, and the melt viscosity at 120° C. was 21,575 Pa·s.

Preparation of Crystalline Polyester Resin 133 g of 1,9-nonanediol (manufactured by Wako Pure Chemical Industries, Ltd.), 167 g of 1,12-dodecane dicarboxylic acid (manufactured by Wako Pure Chemical Industries, Ltd.), and an esterification catalyst were introduced into a 500-milliliter separable flask. Subsequently, nitrogen was introduced into the flask, and while the interior of the flask was stirred with a stirring apparatus, a mixture of 1,9-nonanediol and the esterification catalyst was heated to 80° C. and melted. Subsequently, while the interior of the flask was stirred, the temperature of the mixed solution inside the flask was increased to 97° C. Subsequently, a vacuum (10 mPa·s or less) was drawn inside the flask, and while the interior of the flask was stirred, a dehydration condensation reaction between 1,9-nonanediol and 1,12-dodecane dicarboxylic acid was carried out for 5 hours at 97° C. As a result, a crystalline polyester resin was obtained. The weight average molecular weight of this crystalline polyester resin was 5,600, and Tg2nd–dH was 149 J/g.

A latex of a crystalline polyester resin was obtained by a similar procedure as in the case of the latex of the first amorphous polyester resin, with the exception that a crystalline polyester resin was used instead of the first amorphous polyester resin.

Evaluation of Binder Resin

A latex of one among the first amorphous polyester resins 1 to 4 or the comparative amorphous polyester resin 5 was introduced into 100-ml POLYCUP such that the resin content would be 0.8 g, and then the crystalline polyester resin latex was introduced such that the resin content would be 0.2 g. Dehydration was performed by drawing a vacuum with a freeze-dryer in the order of −40° C./1.5 hours, −10° C./2 hours, and 20° C./5 hours, to obtain a sample for evaluation.

For the sample for evaluation thus obtained, the Tg2nd+dH was measured. The Tg2nd+dH is the calorific value of the sample measured on the second time using a modified differential scanning calorimeter (MDSC). Accordingly, first, for the sample for evaluation, temperature increase was carried out as a first temperature increase process, using a modified differential scanning calorimeter Q2000 (manufactured by TA Instruments, Inc.), from room temperature to 140° C. at a modulation amplitude of 0.1° C., a modulation cycle of 10 seconds, and a rate of 3° C. per minute, and after completion, the temperature was decreased to 0° C. at a rate of 20° C. per minute. The temperature was held at 0° C. for 5 minutes, and then temperature increase was carried out again as a second temperature increase process from 0° C. to 140° C. at a modulation amplitude of 0.1° C., a modulation cycle of 10 seconds, and a rate of 3° C. per minute. Thus, +dH was determined from a differential scanning calorimetric curve thus obtained, and this was designated as Tg2nd+dH. The results are shown in Table 2. As the value of Tg2nd+dH increases, the dispersibility of the crystalline polyester resin in the amorphous polyester resins is improved.

TABLE 2

| | Evaluation Examples | | | | |
|---|---|---|---|---|---|
| | 1 | 2 | 3 | 4 | 5 |
| Type of first amorphous polyester resin | 1 | 2 | 3 | 4 | 5 (Comparative) |
| Tg2nd + dH (J/g) | 19.2 | 18.5 | 19.5 | 11.3 | 1.2 |

Preparation of Colorant Dispersion Liquid 10 g of an anionic reactive emulsifier (HS-10: manufactured by DKS Co. Ltd.) was introduced into a milling bath together with 60 g of a Cyan pigment (CI Pigment Blue 15:3: manufactured by Clariant AG), into which 400 g of glass beads having a diameter of 0.8 to 1 mm were introduced, and milling was performed at normal temperature. As a result, a colorant dispersion liquid was obtained.

Preparation of Toner Particle 500 g of deionized water, 630 g of the latex according to one among the first amorphous polyester resins 1 to 4, 70 g of the latex of the second amorphous polyester resin, and 143 g of the latex of the crystalline polyester resin were added into a 3 L reactor, and subsequently, 60 g of the colorant dispersion liquid, 80 g of a wax dispersion liquid (SELOSOL P-212: manufactured by CHUKYO YUSHI CO., LTD.), and 70 g of polysilicato-iron (PSI-100, manufactured by SUIDO KIKO KAISHA, LTD.) as an aggregating agent were added. While these were stirred using a homogenizer (ULTRA-TURRAX T50™ (trade name) manufactured by IKA-Werke GmbH & CO. KG), the temperature of the mixed solution in the flask was increased to 45° C. at a rate of VC/min. Subsequently, the temperature of the aggregate reaction liquid was increased at a rate of 0.2° C./min to continue an aggregation reaction, to obtain primary aggregated particle (cores) having a volume average particle size of 4 to 6 μm.

In addition, 210 g of a latex of the first amorphous polyester resin of the same kind as the first amorphous polyester resin used as described above was added, and the mixture was caused to aggregate for 30 minutes, so as to form a shell to cover the primary aggregated particle.

A 0.1 N aqueous solution of NaOH was added, and the pH of the mixed liquid was adjusted to 9.5. After a lapse of 20 minutes, the temperature of the mixed liquid was increased, the mixed liquid was subjected to fusing for 3 hours or longer and 5 hours or shorter, to obtain secondary aggregated particles having a volume average particle size of 4 to 7 μm. Into this aggregated reaction liquid, ice of deionized water was introduced at a rate of introduction of 100 ml/10 sec, the aggregated reaction liquid was cooled to 28° C. or lower, and subsequently particles were separated through a filtration process and dried, to obtain toner particles. Regarding the toner particle thus obtained, the mass ratio of first amorphous polyester resins 1 to 4/crystalline polyester resin in the core was 80/20, and the mass ratio of core/shell was 72/28.

Evaluation of Low-Temperature Fixability

The image density of the image on the fed paper was measured using a colorimeter (X-rite eXact, manufactured by X-Rite, Incorporated). Scotch™ (registered trademark) tape was attached to the image, a sheet of paper having a basis weight of 60 g/m$^3$ was interposed between the tape and a weight of 500 g which was reciprocated (e.g., moved back-and-forth) five times over the sheet of paper, after which the tape was peeled off at 180° C. The image density was measured after peeling off the tape, and the image density after peeling with respect to the image density before peeling was designated as the fixing strength. The above-described operation was carried out by varying the heat belt temperature, and the temperature at which the fixing strength reached 90% was designated as the lowest fixing temperature. The results are shown in Table 3. As the lowest fixing temperature decreases, the low-temperature fixability is improved.

TABLE 3

| | Example | | | | Comparative Example |
|---|---|---|---|---|---|
| | 1 | 2 | 3 | 4 | 1 |
| Type of first amorphous polyester resin | 1 | 2 | 3 | 4 | 5 (Comparative) |
| Lowest fixing temperature (° C.) | 130 | 140 | 133 | 143 | 146 |

Examples of the binder resin described above, has improved dispersibility of the crystalline polyester resin in the first amorphous polyester resin. In addition, examples of the above-described toner particle have improved low-temperature fixability.

It is to be understood that not all aspects, advantages and features described herein may necessarily be achieved by, or included in, any one particular example. Indeed, having described and illustrated various examples herein, it should be apparent that other examples may be modified in arrangement and detail.

The invention claimed is:

1. A toner particle comprising:

a binder resin comprising an amorphous polyester resin and a crystalline polyester resin, wherein the amorphous polyester resin comprises, as monomer units, a first monomer having a pendant group, terephthalic acid, and ethylene glycol, wherein the terephthalic acid and ethylene glycol are derived from recycled polyethylene terephthalate, wherein the amorphous polyester resin has a melt viscosity at 120° C. ranging from 413 Pa·s to 848 Pa·s, and wherein the amorphous polyester resin has a glass transition temperature ranging from 50° C. to 80° C., and wherein the binder resin has a calorific value (Tg2nd+dH) of 18.5 J/g to 19.5 J/g, measured by modified differential scanning calorimetry (MDSC);

a colorant; and a wax.

2. The toner particle according to claim 1, wherein the first monomer comprises a polycarboxylic acid having a branch chain having 3 or more carbon atoms.

3. The toner particle according to claim 2, wherein the amorphous polyester resin comprises a polyhydric alcohol other than ethylene glycol, as a monomer unit.

4. The toner particle according to claim 1, wherein a content of the first monomer is of approximately 1% by mole to 15% by mole based on a total amount of the monomer units.

5. The toner particle according to claim 1, wherein a weight average molecular weight of the amorphous polyester resin is of approximately 5,000 to 30,000.

6. The toner particle according to claim 1, wherein a weight average molecular weight of the crystalline polyester resin is of approximately 5,000 to 15,000.

7. The toner particle according to claim 1, comprising:

a core comprising the binder resin, the colorant, and the wax; and a shell comprising the amorphous polyester resin.

8. A method for producing a toner particle comprising a binder resin comprising an amorphous polyester resin and a crystalline polyester resin, a colorant, and a wax, the method comprising:

causing polycondensation components comprising a first monomer having a pendant group to react with recycled polyethylene terephthalate, to obtain the amorphous polyester resin, wherein the amorphous polyester resin has a melt viscosity at 120° C. ranging from 413 Pa·s to 848 Pa·s, and wherein the amorphous polyester resin has a glass transition temperature ranging from 50° C. to 80° C., and wherein the binder resin has a calorific value (Tg2nd+dH) of 18.5 J/g to 19.5 J/g, measured by modified differential scanning calorimetry (MDSC); and obtaining the toner particle from raw materials including the amorphous polyester resin, the crystalline polyester resin, the colorant, and the wax.

9. The method according to claim 8, wherein the first monomer comprises a polycarboxylic acid having a branch chain having 3 or more carbon atoms.

10. The method according to claim 9, wherein the polycondensation components comprise a polycarboxylic acid having no branch chain having 3 or more carbon atoms.

11. The method according to claim 10, wherein the polycondensation components comprise a polyhydric alcohol other than ethylene glycol.

12. The method according to claim 8, wherein a content of the first monomer is of approximately 1% by mole to 15% by mole based on a total amount of the polycondensation components.

13. The method according to claim 8, wherein a weight average molecular weight of the amorphous polyester resin is of approximately 5,000 to 30,000.

14. The method according to claim 8, wherein a weight average molecular weight of the crystalline polyester resin is of approximately 5,000 to 15,000.

15. The method according to claim 8, wherein obtaining the toner particle comprises forming a core with the amorphous polyester resin, the crystalline polyester resin, the colorant, and the wax, and forming a shell including the amorphous polyester resin.

* * * * *